United States Patent
Dhagumudi et al.

(10) Patent No.: US 10,706,388 B2
(45) Date of Patent: *Jul. 7, 2020

(54) SYSTEMS AND METHODS FOR FORMULATING CUSTOMIZED BEVERAGES

(71) Applicant: MyAveta LLC, Tampa, FL (US)

(72) Inventors: Vetrivel Dhagumudi, Alpharetta, GA (US); Suhas Apte, Tampa, FL (US)

(73) Assignee: My Aveta LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,637

(22) Filed: Dec. 2, 2019

(65) Prior Publication Data
US 2020/0104797 A1 Apr. 2, 2020

Related U.S. Application Data

(63) Continuation of application No. 15/523,465, filed as application No. PCT/US2015/058777 on Nov. 3, 2015, now Pat. No. 10,515,340.

(Continued)

(51) Int. Cl.
*G06Q 10/10* (2012.01)
*G07F 13/06* (2006.01)
*G06Q 30/06* (2012.01)

(52) U.S. Cl.
CPC ....... *G06Q 10/101* (2013.01); *G06Q 30/0621* (2013.01); *G07F 13/06* (2013.01)

(58) Field of Classification Search
CPC ... G06Q 10/101; G06Q 30/0621; G07F 13/06

(Continued)

(56) References Cited

U.S. PATENT DOCUMENTS 5,233,520 A * 8/1993 Kretsch .............. G01G 19/4146
600/300
5,672,154 A 9/1997 Sillen et al.
(Continued)

FOREIGN PATENT DOCUMENTS

WO WO-0112039 A2 2/2001
WO WO-0182250 A2 11/2001
WO WO-2016073441 A1 5/2016

OTHER PUBLICATIONS

U.S. Appl. No. 15/523,465, filed May 1, 2017, Systems and Methods for Formulating Customized Beverages.
(Continued)

*Primary Examiner* — Michael Collins
(74) *Attorney, Agent, or Firm* — Schwegman Lundberg & Woessner, P.A.

(57) ABSTRACT

In various example embodiments, a system and method for determining an ideal customized beverage for a particular user and generating user-specific instructions to create the beverage. In example embodiments, a beverage request may be received by the system from a network. The system may further receive and store information about a dispenser responsible for creating the beverage and information about the user. The received information may be used by the system to determine a user-specific ideal beverage formulation. The system may further use the determined formulation to generate user-specific composition instructions and export the instructions over a network to the dispensing device.

24 Claims, 9 Drawing Sheets

Related U.S. Application Data

(60) Provisional application No. 62/074,172, filed on Nov. 3, 2014.

(58) Field of Classification Search
USPC .................................................. 700/231–244
See application file for complete search history.

(56) References Cited

U.S. PATENT DOCUMENTS

| | | | |
|---|---|---|---|
| 6,759,072 B1 | 7/2004 | Gutwein et al. | |
| 7,295,889 B2 * | 11/2007 | Lahteennnaki | A61J 3/002 |
| | | | 700/233 |
| 7,638,148 B2 * | 12/2009 | Lahteenmaki | A23L 2/38 |
| | | | 424/770 |
| 8,504,196 B2 | 8/2013 | Wiles | |
| 9,564,064 B2 | 2/2017 | Minvielle | |
| 9,619,781 B2 | 4/2017 | Minvielle | |
| 9,702,858 B1 | 7/2017 | Minvielle | |
| 10,515,340 B2 * | 12/2019 | Dhagumudi | G07F 13/06 |
| 2005/0048461 A1 | 3/2005 | Lahteenmaki | |
| 2005/0115986 A1 | 6/2005 | Saunders et al. | |
| 2006/0081653 A1 | 4/2006 | Boland et al. | |
| 2006/0134299 A1 | 6/2006 | Lahteenmaki | |
| 2007/0073557 A1 | 3/2007 | Abramson | |
| 2008/0004973 A1 | 1/2008 | Rothschild | |
| 2009/0204473 A1 | 8/2009 | Sommerfeld | |
| 2011/0184812 A1 | 7/2011 | Stoulil | |
| 2012/0156344 A1 | 6/2012 | Studor et al. | |
| 2012/0245732 A1 | 9/2012 | Yoakim | |
| 2013/0062366 A1 | 3/2013 | Tansey | |
| 2013/0218328 A1 | 8/2013 | Rothschild et al. | |
| 2017/0344950 A1 | 11/2017 | Dhagumudi et al. | |

OTHER PUBLICATIONS

"U.S. Appl. No. 15/523,465, Examiner Interview Summary dated Oct. 17, 2019", 4 pgs.

"U.S. Appl. No. 15/523,465, Final Office Action dated Jun. 17, 2019", 19 pgs.

"U.S. Appl. No. 15/523,465, Non Final Office Action dated Feb. 25, 2019", 10 pgs.

"U.S. Appl. No. 15/523,465, Notice of Allowance dated Nov. 12, 2019", 6 pgs.

"U.S. Appl. No. 15/523,465, Preliminary Amendment filed May 1, 2017", 3 pgs.

"U.S. Appl. No. 15/523,465, Response filed May 16, 2019 to Non Final Office Action dated Feb. 25, 2019", 12 pgs.

"U.S. Appl. No. 15/523,465, Response filed Oct. 14, 2019 to Final Office Action dated Jun. 17, 2019", 10 pgs.

"European Application Serial No. 15857522.5, Extended European Search Report dated Mar. 9, 2018", 8 pgs.

"European Application Serial No. 15857522.5, Response filed Jun. 27, 2017 to Communication pursuant to Rule 161(2) & 162 EPC filed Jun. 22, 2017", w/ English Translation, 10 pgs.

"International Application Serial No. PCT/US2015/058777, International Preliminary Report on Patentability dated May 18, 2017", 7 pgs.

"International Application Serial No. PCT/US2015/058777, International Search Report dated Jan. 21, 2016", 2 pgs.

"International Application Serial No. PCT/US2015/058777, Written Opinion dated Jan. 21, 2016", 5 pgs.

* cited by examiner

|  | PARTY TIME | NIGHT HAWK | BODY BUILDER | DAY TIME | ALERT | HAPPY TIME | MORNING FRESH | DRIVE TIME | LIFE | CREMA DELIGHT | NIGHT OWL |
|---|---|---|---|---|---|---|---|---|---|---|---|
| ENERGY COMPONENT | X | X | X | X | X | X | X | X | X |  | X |
| REGULATORY COMPONENT | X | X | X | X | X | X | X | X | X |  | X |
| STIMULATION COMPONENT |  | X | X | X |  | X | X | X | X | X | X |
| RELAXATION COMPONENT |  | X | X |  | X | X |  | X | X | X |  |
| DETOXIFICATION COMPONENT |  |  | X |  |  | X | X |  | X | X |  |
| CREAM |  |  |  |  |  |  |  |  |  | X |  |
| FLAVOR INDICATOR | X | X | X | X | X | X | X | X | X | X | X |
| DELIVERY INDICATOR | X | X | X | X | X | X | X | X | X | X | X |

*FIG. 5*

SYSTEMS AND METHODS FOR FORMULATING CUSTOMIZED BEVERAGES

REFERENCE TO RELATED APPLICATION

This Application is a continuation of U.S. application Ser. No. 15/523,465, filed May 1, 2017, which is a U.S. National Stage Filing under 35 U.S.C. 371 from International Application No. PCT/US2015/058777, filed Nov. 3, 2015, and published as WO2016/073441 on May 12, 2016, which claims the benefit of priority of U.S. Provisional Application No. 62/074,172, filed Nov. 3, 2014, which applications and publications are hereby incorporated by reference in their entirety.

TECHNICAL FIELD

Embodiments of the present disclosure relate generally to customized beverage formulation programs, and more specifically to customized beverage formulation systems allowing in some embodiments, for the receipt of profile data and the generation of specific instructions in response to the profile data.

BACKGROUND

Conventionally, most energy and vitamin-supplying beverages only offer set formulas that do not always match the consumer's nutritional requirements or health goals. In response, customized beverages that are tailored to a particular consumer's nutritional requirements and health goals are gaining popularity.

SUMMARY

In one example embodiment, method for producing a customized beverage formulation is provided. The method includes receiving and storing user information in a user profile. The profile may, for example, include information relating to a user's nutritional requirements, energy requirements, vitamin requirements, and exercise regime. The method further comprises receiving, via a network, a request to produce a customized beverage. The request preferably includes a bar code (or other) identifier unique to the user profile. The method includes maintaining, over the network, dispenser information including an ingredient inventory at a dispensing station. Based on the user information, and preferably the maintained dispenser information, a formulation for a customized beverage, which may include a combination of energy and vitamin ingredients, is formulated. The method further includes generating user-specific instructions for adding and mixing the ingredients based on the formulation and exporting the user-specific instructions via the network for use at a dispenser station.

In another example embodiment, a system for producing a customized beverage formulation is provided. The system comprises at least one intake module, executing on one or more processors, configured to receive a request, preferably the request including a bar code identifier unique to the user profile, to produce customized beverage; receive dispenser information including available ingredients and the quantities of those ingredients; at least one memory module, executing on one or more computer processors, configured to store user information about a user's nutritional requirements, energy requirements, or vitamin requirements on a profile; at least one formulation module, executing on one or more processors, configured to determine the formulation of a customized beverage based on user information and dispenser information; and generate user-specific instructions for adding and mixing ingredients based on the determined formulation. The system may further include at least one export module, executing on one or more processors, configured to export the user-specific instructions to a network.

In another example embodiment, a machine readable medium for producing a customized beverage formulation is provided. The machine-readable medium includes instructions, which when performed by a machine, causes the machine to perform the operations of storing user information about a user's nutritional, energy, and vitamin requirements in a profile; receiving a request, the request preferably including a bar code identifier unique to the user profile, to produce a customized beverage; receiving dispenser information including available ingredients and the quantities of those ingredients; determining the formulation of a customized beverage based on user information and dispenser information; generating user-specific instructions for adding and mixing ingredients based on the determined formulation; and exporting the user-specific instructions to a network.

In other example embodiments, systems and methods are provided to receive user information related to a specific user and dispenser information related to a specific device and to generate unique instructions for the purpose of producing a customized beverage. User nutrition and health can be dramatically improved by providing customized beverages that are formulated to provide the ideal energy and vitamin supplementation for an individual. Allowing greater customization allows a user to receive appropriate levels of necessary nutritional and energy requirements rather than insufficient levels or unnecessarily high levels. This customized functionality can promote user nutrition, wellness and health as well as reduce ingredient cost and waste.

In another example embodiment, a system for formulating a customized beverage comprises at least one module, executing on one or more computer processors, to receive an indication to formulate receive user information and data information, the user information including data about a user's age, gender, nutritional requirements, and health goals and the dispenser information including available beverage ingredients and quantities of those ingredients; identify an ideal formulation of a user-specific nutritional beverage, the beverage taking into account user information and dispenser information; and generate user-specific beverage composition instructions for adding and mixing ingredients based on the determined formulation.

In other embodiments, a dispenser station may present one or more user choices related to the dietetic or flavor content of the customized beverage. Alternatively, the dispenser station may present at least one question associated with responses that correlate to a user choice. Further alternatively, at least one previously ordered formula for a customized beverage may be stored in a database, such as on the user profile, and a dispenser station may present at least one user choice that is associated with a formula for a customized beverage that the user has previously ordered.

BRIEF DESCRIPTION OF THE DRAWINGS

Various ones of the appended drawings merely illustrate example embodiments of the present disclosure and cannot be considered as limiting its scope.

FIG. 5 is a table illustrating example formulations of various drinks.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a customized beverage formulation system can communicate with a network to gather user and dispenser data to determine the ideal formulation of a nutrition beverage for a user and export user-specific beverage composition instructions to the network. The example systems and methods disclosed herein may at least be partially deployed using a special application executing on a suitably configured mobile electronic device.

Figure 1:
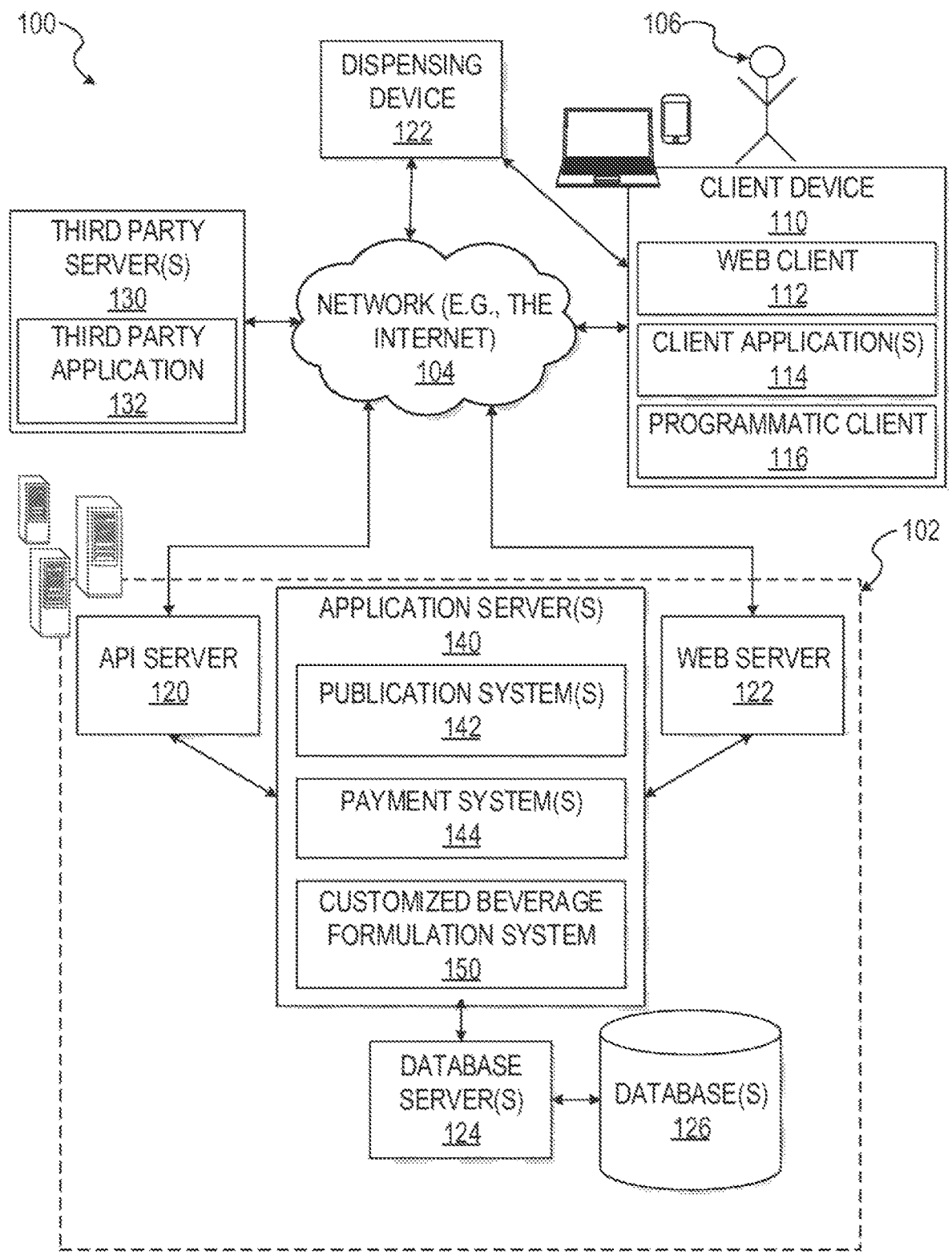
FIG. 1 is a block diagram illustrating a networked system, according to some example embodiments.

With reference to FIG. 1, an example embodiment of a high-level client-server-based network architecture 100 is shown. A networked system 102 provides server-side functionality via a network 104 (e.g., the Internet or wide area network (WAN)) to a client device 110. A user (e.g., user 106) may interact with the networked system 102 using the client device 110. Additionally, a dispensing device 108 (such as a customized beverage dispenser) may interact with both the networked system 102 and the client device 110. FIG. 1 illustrates, for example, a web client 112 (e.g., a browser, such as the Internet Explorer® browser developed by Microsoft® Corporation of Redmond, Wash.), client application(s) 114, and a programmatic client 116 executing on the client device 110. The client device 110 may include the web client 112, the client application(s) 114, and the programmatic client 116 alone, together, or in any suitable combination. Although FIG. 1 shows one client device 110, multiple client devices may be included in the network architecture 100.

The client device 110 may comprise a computing device that includes at least a display and communication capabilities that provide access to the networked system 102 via the network 104. The client device 110 may comprise, but is not limited to, a remote device, work station, computer, general purpose computer, Internet appliance, hand-held device, wireless device, portable device, wearable computer, cellular or mobile phone, personal digital assistant (PDA), smart phone, tablet, ultrabook, netbook, laptop, desktop, multi-processor system, microprocessor-based or programmable consumer electronic, game consoles, set-top box, network PC, mini-computer, and the like. In further example embodiments, the client device 110 may comprise one or more of a touch screen, accelerometer, gyroscope, biometric sensor, camera, microphone, global positioning system (GPS) device, and the like.

The client device 110 may communicate with the network 104 via a wired or wireless connection. For example, one or more portions of the network 104 may be an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (Wi-Fi®) network, a Worldwide Interoperability for Microwave Access (WiMax) network, another type of network, or a combination of two or more such networks.

The client device 110 may include one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, e-commerce site apps (also referred to as "marketplace apps"), and so on. The client application(s) 114 may include various components operable to present information to the user and communicate with networked system 102. The client device 110 and client application(s) 114 may also include methods to communicate directly with a dispensing device 108 such as using an RFID signal or allowing a bar code to be scanned. In some embodiments, if the e-commerce site application is included in the client device 110, then this application may be configured to locally provide the user interface and at least some of the functionalities with the application configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 may use its web browser to access the e-commerce site (or a variant thereof) hosted on the networked system 102.

In various example embodiments, the users (e.g., the user 106) may be a person, a machine, or other means of interacting with the client device 110. In some example embodiments, the users may not be part of the network architecture 100, but may interact with the network architecture 100 via the client device 110 or another means. For instance, the users may interact with client device 110 that may be operable to receive input information from (e.g., using touch screen input or alphanumeric input) and present information to (e.g., using graphical presentation on a device display) the users. In this instance, the users may, for example, provide input information to the client device 110 that may be communicated to the networked system 102 via the network 104. The networked system 102 may, in response to the received input information, communicate information to the client device 110 or the dispensing device 108 via the network 104 to be presented to the users. In this way, the user may interact with the networked system 102 using the client device 110.

An Application Program Interface (API) server 120 and a web server 122 may be coupled to, and provide programmatic and web interfaces respectively to, one or more application server(s) 140. The application server(s) 140 may host one or more publication system(s) 142, payment system (s) 144, and a customized beverage formulation system 150, each of which may comprise one or more modules or applications and each of which may be embodied as hardware, software, firmware, or any combination thereof. The application server(s) 140 are, in turn, shown to be coupled to one or more database server(s) 124 that facilitate access to one or more information storage repositories or database (s) 126. In an example embodiment, the database(s) 126 are storage devices that store information to be posted (e.g., publications or listings) to the publication system(s) 142. The database(s) 126 may also store digital goods information in accordance with some example embodiments.

Additionally, a third party application 132, executing on a third party server 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

The publication system(s) 142 may provide a number of publication functions and services to the users that access the networked system 102. The payment system(s) 144 may likewise provide a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some example embodiments, the payment system(s) 144 may form part of the publication system(s) 142.

The customized beverage formulation system 150 may provide functionality to create user-specific beverage composition instructions based on user and dispenser information. In some example embodiments, the customized beverage formulation system 150 may communicate with the client device 110, the third party server(s) 130, the publication system(s) 142 (e.g., retrieving listings), and the payment system(s) 144 (e.g., purchasing a listing). The customized beverage formulation system 150 may be configured to receive user and dispenser information, further receive a request for a beverage from a network 104 or from a dispensing device 108, determine an ideal formulation of a customized beverage, and generate and export user-specific beverage composition instructions. In an alternative example embodiment, the customized beverage formulation system 150 may be a part of the publication system(s) 142.

Further, while the client-server-based network architecture 100 shown in FIG. 1 employs a client-server architecture, the present inventive subject matter is, of course, not limited to such an architecture, and may equally well find application in a distributed, or peer-to-peer, architecture system, for example. The various systems of the applications server(s) 140 (e.g., the publication system(s) 142 and the payment system(s) 144) may also be implemented as stand-alone software programs, which do not necessarily have networking capabilities.

The web client 112 may access the various systems of the networked system 102 (e.g., the publication system(s) 142) via the web interface supported by the web server 122. Similarly, the programmatic client 116 and client application (s) 114 may access the various services and functions provided by the networked system 102 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

FIG. 1B illustrates a block diagram showing components provided within the publication system(s) 142, according to some embodiments. In various example embodiments, the publication system(s) 142 may comprise a market place system to provide market place functionality (e.g., facilitating the purchase of items associated with item listings on an e-commerce website). The networked system 102 may be hosted on dedicated or shared server machines that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more database(s) 126 via the database server(s) 124.

In some example embodiments, a personalization engine 170 may allow the users of the networked system 102 to personalize various aspects of their interactions with the networked system 102. For instance, the users may define, provide, or otherwise communicate personalization settings that the personalization engine 170 may use to determine interactions with the networked system 102. In further example embodiments, the personalization engine 170 may automatically determine personalization settings and personalize interactions based on the automatically determined settings. For example, the personalization engine 170 may determine a native language of the user and automatically present information in the native language.

Figure 2:
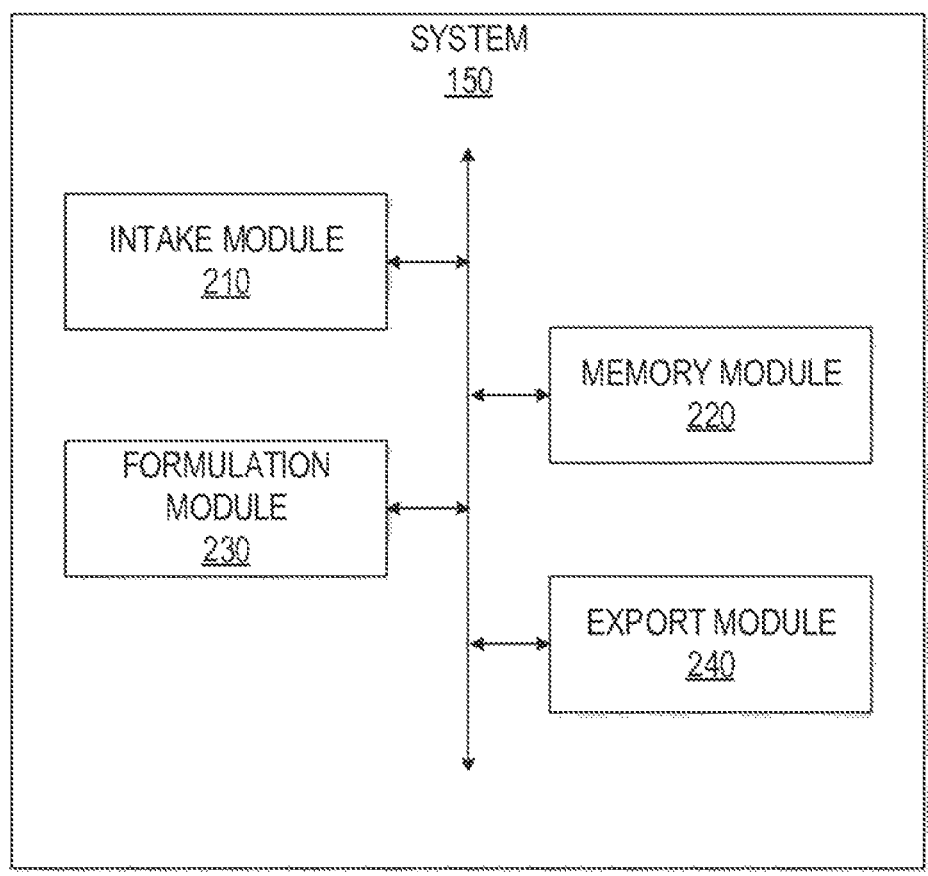
FIG. 2 is a block diagram illustrating architecture and functioning of as customized beverage formulation system according to example embodiments.

FIG. 2 is a block diagram of the customized beverage formulation system 150, which may provide functionality to receive user data and one or more beverage requests, store user data and maintain dispenser data, determine a customized beverage formulation and generate user-specific beverage composition instructions, and exporting user-specific beverage composition instructions to a networked system 102.

In an example embodiment, the customized beverage formulation system 150 may include an intake module 210, a memory module 220, a formulation module 230, and an export module 240. All, or some, of the modules 210-240 of FIG. 2, may communicate with each other, for example, via a network coupling, shared memory, and the like.

It will be appreciated that each module of modules 210-240 may be implemented as a single module, combined into other modules, or further subdivided into multiple modules. Other modules not pertinent to example embodiments may also be included, but are not shown.

An intake module 210 may be capable communicating and retrieving this data over the networked system 102 or the network generally 104. In an example embodiment user information retrieved by the intake module 210 may comprise information associated with a user or user information. Such information may include the nutritional and/or energy requirements of a particular individual. In a non-limiting example, the intake module 210 may receive the daily Vitamin A and Vitamin E requirements for a 200-pound male. These requirements may differ from those of a smaller individual or a female.

User information retrieved from the intake module 210 may further include information about a user's health goals. In another non-limiting example, user information retrieved by the intake module 210 may comprise an indication that it is flu season and the user wishes to boost his or her immunity with a high daily intake of Vitamin C.

In addition to retrieving user information, the intake module 210 may further be made capable of receiving a request for a user-specific customized beverage formulation from a networked system 102. This request may be transmitted from the user to the network using various methods.

In a preferred embodiment, a user may use a barcode capable of being read by a barcode reader optionally on the dispensing device 108 to request a beverage. The barcode can be optionally affixed with the client device 110 or some other object in the user's possession. In a non-limiting example, a user may present a barcode affixed with the user's mobile device to a barcode scanner affixed with a dispensing device. The barcode can indicate a request for a customized beverage by a user associated with the barcode and can be transmitted from the dispensing device over a network 104 to the intake module. Various alternative embodiments exist beyond barcodes for receiving a beverage request from a user, including an RFID associated with a user, a mobile application on the user's client device 110, a fingerprint scanner, a PIN keypad, or a card swipe.

After retrieval by the intake module 210 user information may be transmitted to and stored in a memory module 220. The memory module 220 may be capable of receiving storing and maintaining user information as well as dispenser information. User information may be maintained as a user profile containing a user's nutritional requirements and health goals. In an embodiment, the user profile can also contain user preferences such as preferred beverage flavor or preferred beverage temperature.

Dispenser information maintained by the memory module 220 may include the ingredient inventories of all dispensing devices maintained by the customized beverage formulation system. Dispenser information can be received by the memory module 220 optionally through the intake module 210 from a network 104 or directly from the dispensing device 108. For example, a particular dispenser may be designed to include various quantities of an ingredient, and the dispensing device 108 can communicate with the customized beverage formulation system 150, optionally via a network 104, the types of ingredients available and the remaining quantities. For example, a dispensing device 108 located at a fitness center may contain higher quantities of nutritional electrolytes that a dispensing device 108 located elsewhere. This information could be maintained by the memory module 220 in the event that a user initiates a beverage request with the dispensing device 108.

A formulation module 230 may be configured to determine an ideal beverage formulation for a user and generate user-specific beverage composition instructions in response to a beverage request received by the intake module 210. The ideal beverage formulation may be determined using various algorithms based user information and dispenser information stored on and maintained by the memory module 240.

In an example embodiment, the formulation module 230 may receive a beverage request from the intake module 210 and communicate with the memory module 220 that the request originates from a 35 year old, 170 pound male individual at a fitness center. The formulation module 230 may further receive information the individual has a higher Vitamin A requirement than standard and that the individual usually requests a beverage from the fitness center dispensing device 108 after finishing a cardiovascular workout and that the dispensing device 108 has adequate vitamins and electrolytes in its inventory. Based on this data, the formulation module 230 determines a high electrolyte and high Vitamin A formulation, for a customized beverage. The formulation module 230 may then be capable of generating instructions about how to create the high electrolyte/Vitamin A beverage such that the dispensing device 108 will be able to create a beverage corresponding to the determined user-specific formulation.

In another example, the same individual may also be a truck driver and about to start a 10 hour shift after his workout. For this reason, he may require an additional dose of caffeine. Responsive to a request by the intake module 210, the memory module 220 may also store information about the individual's work schedule. The formulation module 230 can, for example, receive further information that the individual's work schedule suggests an extra dose of caffeine should be added to the formulation and that the dispensing device 108 has an adequate quantity of a caffeine ingredient in its inventory. The formulation module 230 may then be capable of generating instructions about how to add an additional caffeine dose to the customized beverage such that the dispensing device 108 will be able to create the customized beverage.

An export module 240 may be configured to transmit user-specific beverage composition instructions generated by the formulation module 230 to a network 104, and to the dispensing device 108 correlated to the request. The export module 240 may further communicate to a user's client device 110 and the dispensing device 108 that the beverage request has been processed and accepted to offer presentation to the user that the customized beverage will be dispensed.

Figure 3:
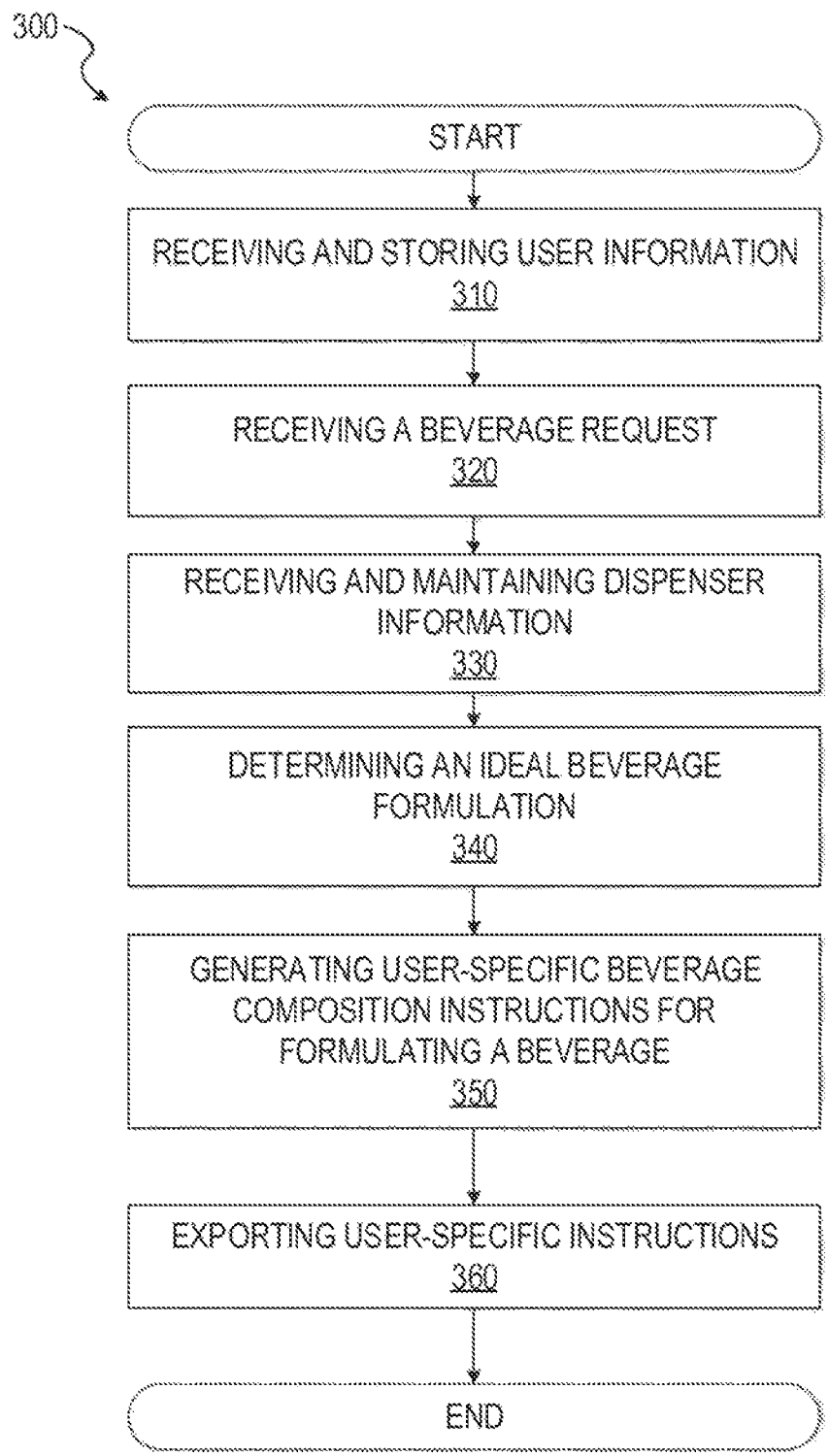
FIG. 3 is a flow diagram illustrating the steps involved in formulating a customized beverage according to example embodiments.

FIG. 3 is a flow diagram illustrating an example method 300 for the customized beverage formulation system 150. As described in the preceding paragraphs, the invention can function by first receiving user information and storing the user information 310, such as in a user profile. The user information can be received over a network 102 from a dispensing device 108 or from various client applications and third party applications using an intake module 210. The user information can further be stored on a memory module 220 and aggregated into a user profile.

In addition to receiving and storing user information, the invention further functions by receiving a beverage request 320 made by or on behalf of the user. As described above, this may include receiving an indication from a network 102 that a user has made a request, such as by scanning a barcode, swiping a card, or otherwise indicating desire for a beverage. The signal generated by the code or card can be associated with the user and received by an intake module 210.

In an alternative embodiment, the dispensing device 108 may automatically generate a request for a user depending on the user's location, the time of day, or the user's activity. For example, the dispensing device 108 may receive an indication that the user is engaging in cardiovascular exercise in the same fitness center where the dispensing device 108 is located, and may automatically send a beverage request over a network 102 to an intake module 104 in a customized beverage formulation system 150.

The invention further functions by receiving and maintaining dispenser information 330. As described above, dispenser information may include the types of ingredients in a particular dispensing device's 108 inventory and the numeric levels or inventories of these ingredients. The dispenser information may be received by an intake module 210 or a memory module 220. The dispenser information may be further maintained by a memory module 220. In this way, the invention can not only determine the ideal beverage for a specific user, it can determine the ideal beverage for a specific user given the available ingredients. The invention further functions by generating user-specific beverage composition instructions for formulating a beverage 350 based on the determined ideal beverage formulation 340. The user-specific beverage composition instructions may differ from a user-specific determined formulation of a beverage because a formulation describes the relative ingredients of a beverage and user-specific instructions are directives readable by a machine, such as a dispensing device 108, which disclose exact quantities to reach an ideal user-specific beverage compilation. For example, a user-specific beverage formulation may require 93% filtered water, 4% of liquid electrolyte A, and 3% of liquid Vitamin X. From this formulation, user-specific beverage composition instructions may be generated to direct a dispensing device 108 to combine 465 ml of filtered water, 20 ml of liquid electrolyte A, and 15 ml of liquid Vitamin X.

Another example, a user-specific energy beverage formulation may require 93% filtered water, a pre-formulated powder consisting of energy ingredient, Sugar and/or Natural Sweetener, Vitamin ingredients, optionally flavor and dietetic ingredient is included in the powder and/or added separately per users choice. From this formulation, user-specific beverage composition instructions may be generated to direct a dispensing device 108 to combine 485 ml of filtered water, and 15 grams of formulated powder.

The invention further functions by exporting user-specific instructions 360 to a network 102 or directly to a dispensing device 108 directing the dispensing device 108 to combine specific ingredients in order to create a beverage. The invention can additionally export an indication the dispensing device 108 or to a user's client device 110 to cause presentation of a message that the beverage is now being dispensed. The presentation to the user can be accomplished using a variety of means including visually displaying information and using other device outputs (e.g., acoustic, haptic).

Figure 4:
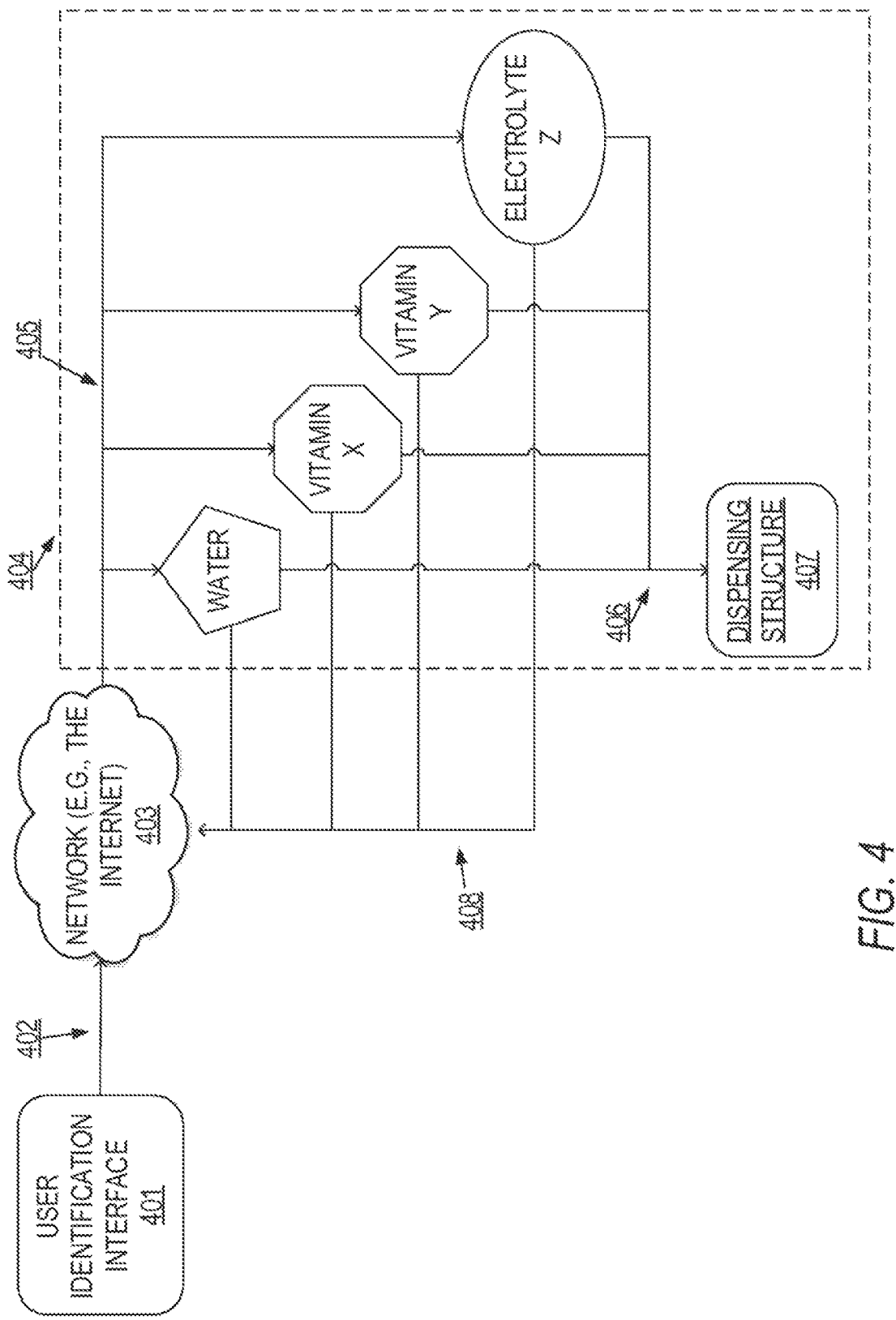
FIG. 4 is a block diagram illustrating the delivery of user-specific beverage composition instructions to a dispensing device and the formulation of a customized beverage.

FIG. 4 is a block diagram illustrating how user-specific composition instructions may be received by a dispensing device. First, a beverage request 402 may be sent by a user interaction interface 401. This could include a user scanning a barcode on a barcode reader coupled with a dispensing device 108, a card-swipe, a fingerprint scanner, or a mobile application on a client device 110. As described above, a beverage request 402 can be made automatically or via user initiation. The beverage request 402 may be exported to a network 403 where it may be received by a customized beverage formulation system 150. The customized beverage formulation system may generate user-specific beverage composition instructions 405 and export them back to the network 102 or a dispensing device 108, 404. The dispensing device 404 may be capable of receiving user-specific beverage composition instructions 405. The instructions may further correlate to quantities of ingredients to be added to create the ideal beverage formulation for a user. Ingredients can include, but are not limited to, water, vitamins, stimulants, sugars, flavors, and electrolytes. Once the instructions are received by the dispensing device 404, each indicated ingredient may be mixed and transmitted 406 to the dispensing structure 407 of the device. The dispensing device 404 may further export dispenser data 408 to a network 403 and further to a customized beverage formulation system 150 about the identities and quantities of available ingredients in the dispenser's inventory.

FIG. 5 is a table illustrating example formulations of various drinks which in this instance are capable of further customization within the dispensing device 404. Various ingredients including vitamins, nutritional supplements, energy sugar supplements, stimulants, and texture components. The ingredients are referred to as general categories in the table such as "Stimulant" or "Antioxidant" and are not limited to these categories. Further, the dispensing device 404 may receive a "flavor indicator" over a network 104 to provide instructions for flavoring the beverage. Additionally, the dispensing device may receive a "delivery indicator" over a network 104 to provide instructions relating mixing and delivery of the customized beverage. Additionally FIG. 5 shows various categories of formulations including "Party Time" and "Drive Time" that may serve as base formulations selected by the user. In an example, a user is about to begin a two-hour drive and would like to be refreshed and kept alert during the drive. The user could select "Drive Time" from a user interface such as a graphical user interface on the dispensing device 404. The dispensing device 404 can then be capable of transmitting the information over a network 104 for the purpose of adjusting user-specific beverage instructions to best fit the current state of the user.

Figure 6:
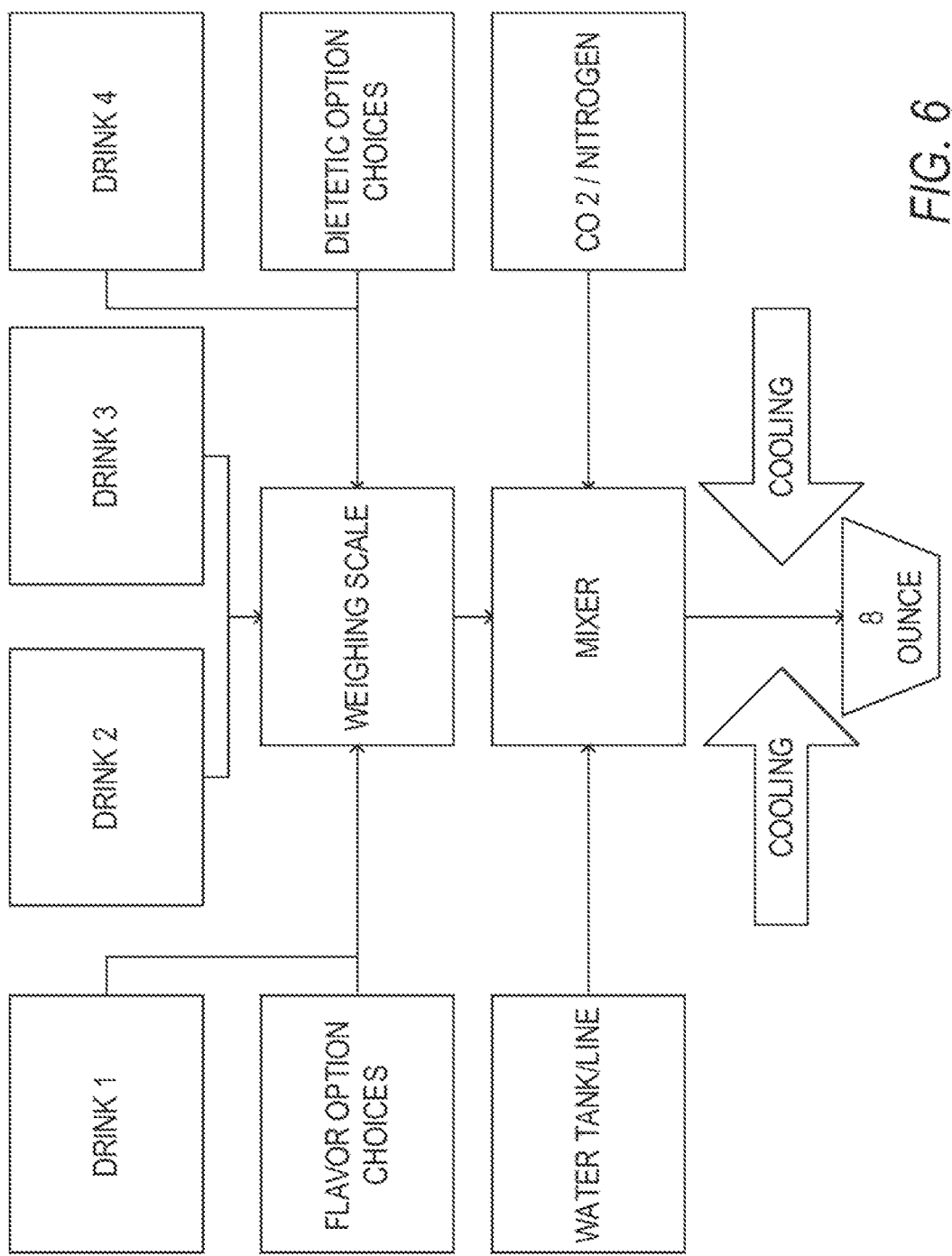
FIG. 6 is a block diagram further illustrating the dispensing device composing and delivering a customized beverage.

FIG. 6 is a block diagram further illustrating the dispensing device 404 composing a delivering a customized beverage. The diagram details an embodiment where powdered ingredients for various drink formulations ("Drink 1," "Drink 2," etc.) may be stored together in the dispensing device 404. A user may be presented with one or more user choices, such as "Dietetic Option Choices" related to the desired nutritional or energy-related composition of the beverage the user would prefer. Additionally, a user may be presented with user choices in the form of "Flavor Option Choices" related to the desired flavor that the user would prefer. This information may further be transmitted over a network 104 for the purpose of adjusting user-specific beverage instructions to best fit the current state of the user.

In another embodiment, a user may be presented with one or more questions on a user interface. The user's response to the questions could constitute a user choice and correlate to one or more "Dietetic Option Choices" or "Flavor Option Choices." Further, a user's history of ordering beverages may be stored on a database, such as the user profile, over a network 104 and beverages previously ordered by the user may be presented as user choices on a user interface.

Once user-specific beverage instructions are received, the quantities of powdered drink mixtures from "Drink 1,"

"Drink 2," "Drink 3," and "Drink 4" may be combined and weighed on a "weighing scale" within the dispensing device 404. The "weighing scale" may provide functionality to assess the weight of each powder do ensure the correct composition of ingredients according to the user-specific beverage instructions are used.

After the mixture is weighed, the composed ingredients can further be transported to a "Mixer" where the ingredients are combined with water from a storage tank or water line and optionally with carbon dioxide (CO 2) or nitrogen to provide carbonation for the beverage. The water received from the water tank or water line may be chilled prior to mixing using various forms or refrigeration or rapid cooling. The "Mixer" may also be pressurized in order to allow for appropriate carbonation. Finally, the mixed customized beverage may be rapidly cooled using various methods and then deposited in a cup such as an "8 ounce" cup for a user to consume.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Mobile Applications

Figure 7:
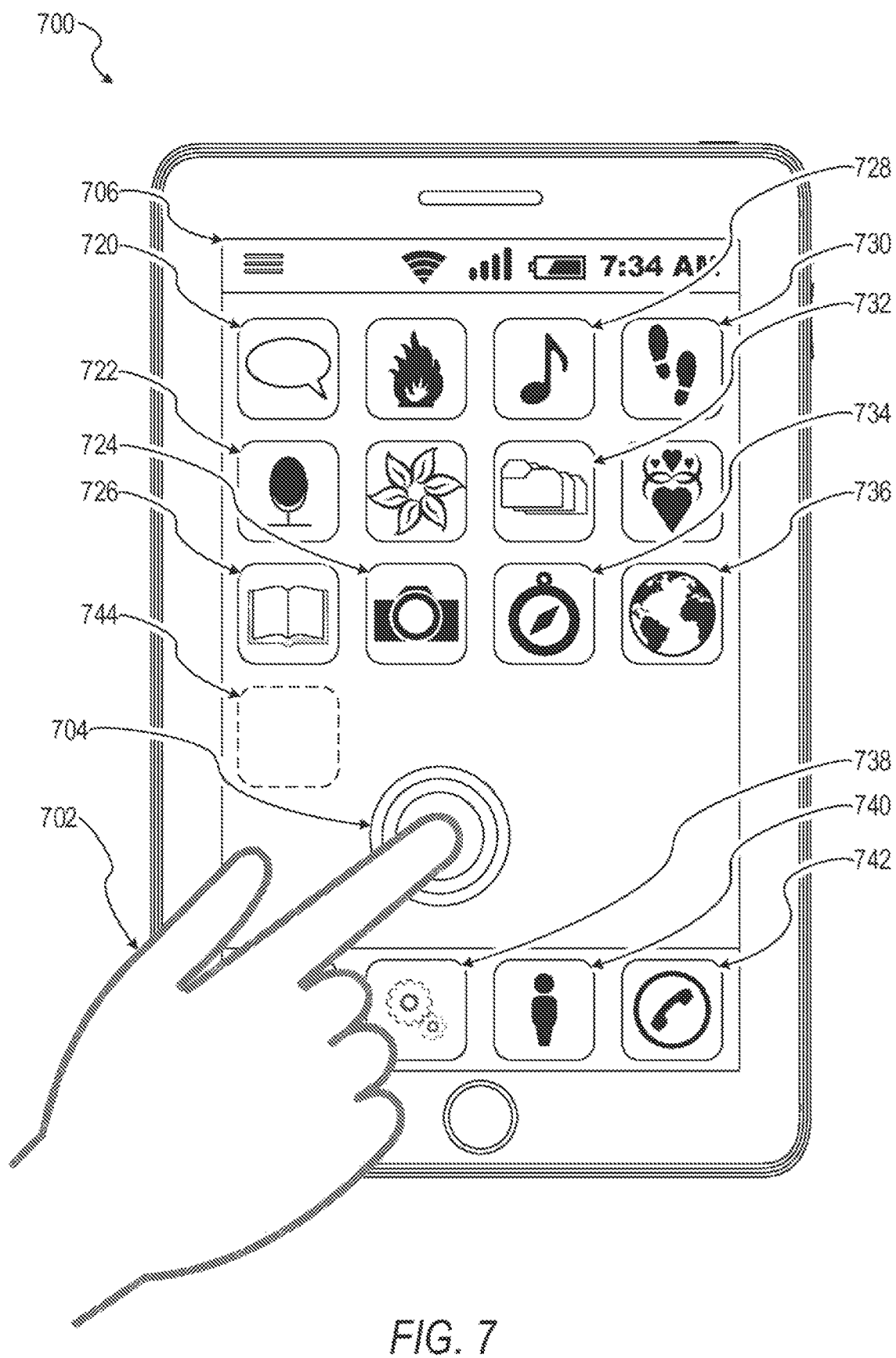
FIG. 7 illustrates an example mobile device and mobile operating system interface, according to some example embodiments.

FIG. 7 illustrates an example mobile device 700 that may be executing a mobile operating system (e.g., iOS™, Android™, Windows® Phone, or other mobile operating systems), according to example embodiments. In one embodiment, the mobile device 700 may include a touch screen that may receive tactile information from a user 702. For instance, the user 702 may physically touch 704 the mobile device 700, and in response to the touch 704, the mobile device 700 may determine tactile information such as touch location, touch force, gesture motion, and so forth. In various example embodiment, the mobile device 700 may display home screen 706 (e.g., Springboard on iOS™) that the user 702 of the mobile device 700 may use to launch applications and otherwise manage the mobile device 700. In various example embodiments, the home screen 706 may provide status information such as battery life, connectivity, or other hardware status. The home screen 706 may also include a plurality of icons that may be activated to launch applications, for example, by touching the area occupied by the icon. Similarly, other user interface elements may be activated by touching an area occupied by a particular user interface element. In this manner, the user 702 may interact with the applications.

Many varieties of applications (also referred to as "apps") may be executing on the mobile device 700. The applications may include native applications (e.g., applications programmed in Objective-C running on iOS™ or applications programmed in Java running on Android™), mobile web applications (e.g., HTML5), or hybrid applications (e.g., a native shell application that launches an HTML5 session). In a specific example, the mobile device 700 may include a messaging app 720, audio recording app 722, a camera app 724, a book reader app 726, a media app 728, a fitness app 730, a file management app 732, a location app 734, a browser app 736, a settings app 738, a contacts app 740, a telephone call app 742, other apps (e.g., gaming apps, social networking apps, biometric monitoring apps), a third party app 744, and so forth.

Software Architecture

Figure 8:
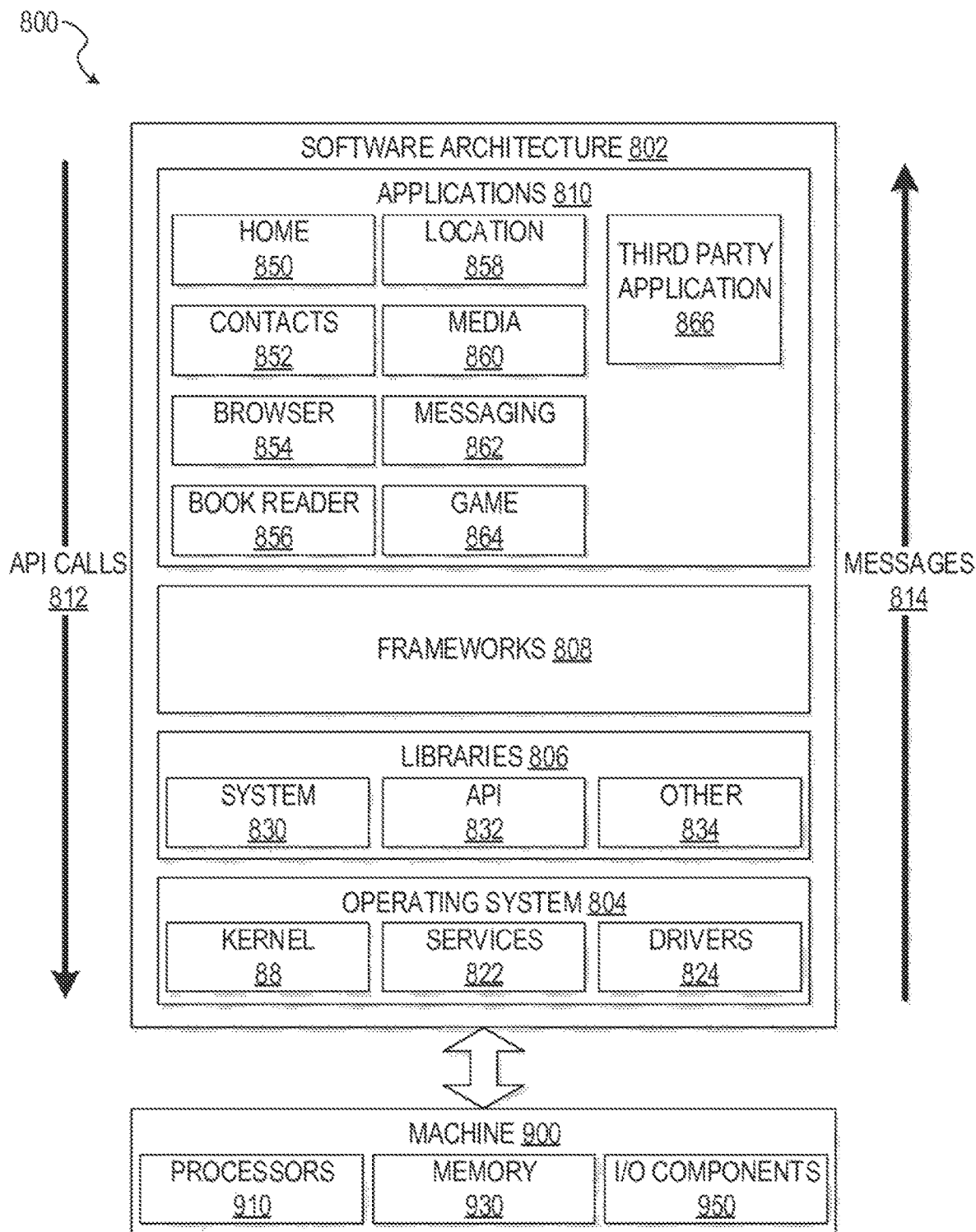
FIG. 8 is a block diagram illustrating an example of a software architecture that may be installed on a machine, according to some example embodiments.

FIG. 8 is a block diagram 800 illustrating an architecture of software 802, which may be installed on any one or more of devices described above. FIG. 8 is merely a non-limiting example of a software architecture and it will be appreciated that many other architectures may be implemented to facilitate the functionality described herein. The software 802 may be executing on hardware such as machine 900 of FIG. 9 that includes processors 910, memory 930, and I/O components 950. In the example architecture of FIG. 8, the software 802 may be conceptualized as a stack of layers where each layer may provide particular functionality. For example, the software 802 may include layers such as an operating system 804, libraries 808, frameworks 808, and applications 810. Operationally, the applications 810 may invoke application programming interface (API) calls 812 through the software stack and receive messages 814 in response to the API calls 812.

The operating system 804 may manage hardware resources and provide common services. The operating system 804 may include, for example, a kernel 820, services 822, and drivers 824. The kernel 820 may act as an abstraction layer between the hardware and the other software layers. For example, the kernel 820 may be responsible for memory management, processor management (e.g., scheduling), component management, networking, security settings, and so on. The services 822 may provide other common services for the other software layers. The drivers 824 may be responsible for controlling or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 806 may provide a low-level common infrastructure that may be utilized by the applications 610. The libraries 606 may include system 630 libraries (e.g., C standard library) that may provide functions such as memory allocation functions, string manipulation functions, mathematic functions, and the like. In addition, the libraries 6806 may include API libraries 832 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 806 may also include a wide variety of other libraries 834 to provide many other APIs to the applications 810.

The frameworks 808 may provide a high-level common infrastructure that may be utilized by the applications 810. For example, the frameworks 808 may provide various graphic user interface (GUI) functions, high-level resource management, high-level location services, and so forth. The frameworks 808 may provide a broad spectrum of other APIs that may be utilized by the applications 810, some of which may be specific to a particular operating system or platform.

The applications 810 include a home application 850, a contacts application 852, a browser application 854, a book reader application 856, a location application 858, a media application 860, a messaging application 862, a game application 864, and a broad assortment of other applications such as third party application 866. In a specific example, the third party application 866 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third party application 866 may invoke the API calls 812 provided by the mobile operating system 604 to facilitate functionality described herein.

Example Machine Architecture and Machine-Readable Medium

Figure 9:
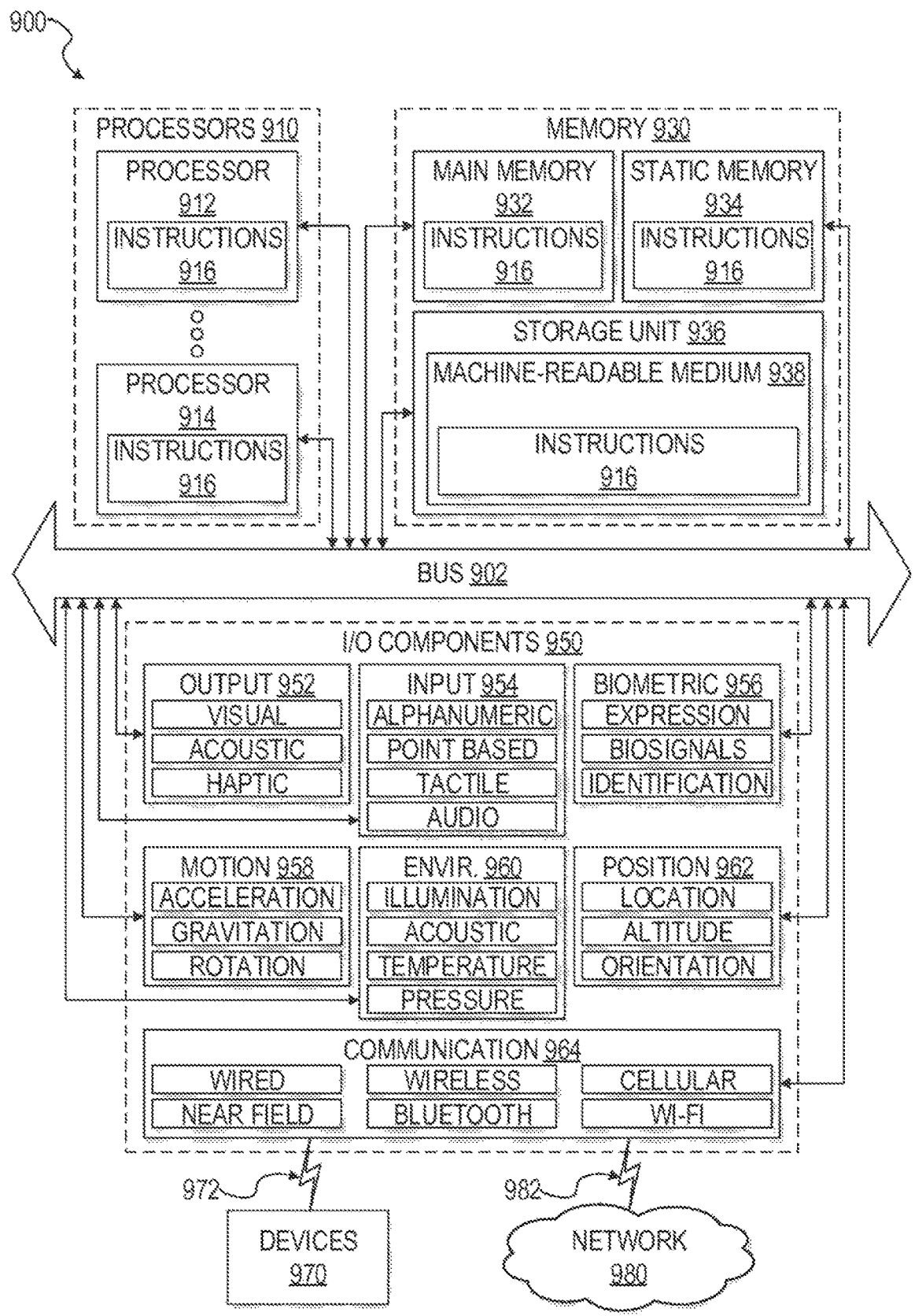
FIG. 9 illustrates a diagrammatic representation of a machine in the form of a computer system within which a set of instructions may be executed for causing the machine to perform any one or more of the methodologies discussed herein, according to an example embodiment.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 750, which may be configured to communicate with each other via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 912 and processor 914 that may execute instructions 916. The term "processor" is intended to include multi-core processor that may comprise two or more independent processors (also referred to as "cores") that may execute instructions contemporaneously. Although FIG. 9 shows multiple processors, the machine 900 may include a single processor with a single core, a single processor with multiple cores (e.g., a multi-core process), multiple processors with a single core, multiple processors with multiples cores, or any combination thereof.

The memory 930 may include a main memory 932, a static memory 934, and a storage unit 936 accessible to the processors 910 via the bus 902. The storage unit 936 may include a machine-readable medium 938 on which is stored the instructions 916 embodying any one or more of the methodologies or functions described herein. The instructions 916 may also reside, completely or at least partially, within the main memory 932, within the static memory 934, within at least one of the processors 910 (e.g., within the processor's cache memory), or any suitable combination thereof, during execution thereof by the machine 900. Accordingly, the main memory 932, static memory 934, and the processors 710 may be considered as machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown in an example embodiment to be a single medium, the term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 950 may include a wide variety of components to receive input, provide output, produce output, transmit information, exchange information, capture measurements, and so on. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Furthermore, the machine-readable medium 938 is non-transitory (in other words, not having any transitory signals) in that it does not embody a propagating signal. However, labeling the machine-readable medium 938 as "non-transitory" should not be construed to mean that the medium is incapable of movement; the medium should be considered as being transportable from one physical location to another. Additionally, since the machine-readable medium 938 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifica- Statements 1. A method for producing a customized beverage formulation, the method comprising: receiving and storing user information on a user profile including information relating to a user's nutritional requirements and/or exercise; receiving, from a network, a request to produce a customized beverage, the request preferably including an identifier unique to the user profile; maintaining, over a network, dispenser information including an ingredient inventory at a dispensing station; based on the user information, determining a formulation of a customized beverage including an ingredient; based on the formulation, generating user-specific beverage composition instructions for adding and mixing the ingredients; exporting the user-specific instructions to a network.

2. The method of statement 1, wherein determining the formulation of a customized beverage is further based on at least one user choice collected at or about the time the request to produce a customized beverage is received.

3. The method of statements 1 or 2, wherein the at least one user choice includes selections made by the user in response to questions presented to the user on a user interface.

4. The method of any one of statements 1-3, wherein exporting the user-specific instructions includes updating the user profile with information related to the composition of the customized beverage.

5. The method of any one of statements 1-4, wherein the composition of the customized beverage is stored at a database and presented to the user as one of the at least one user choices.

6. The method of any one of statements 1-5, wherein determining a formulation of a customized beverage including an ingredient includes using the maintained dispenser information.

7. A system for producing a customized beverage formulation comprising: at least one intake module, executing on one or more processors, configured to: receive a request, to produce customized beverage, the request preferably including an identifier unique to the user profile; maintain, over a network, dispenser information including an ingredient inventory at a dispensing station; at least one memory module, executing on one or more computer processors, configured to store user information about a user's nutritional requirements on a profile; at least one formulation module, executing on one or more processors, configured to: determine the formulation of a customized beverage; generate user-specific beverage composition instructions for adding and mixing ingredients based on the determined formulation; at least one export module, executing on one or more processors, configured to export the user-specific instructions to a network.

8. The system of statement 7, wherein at least one formulation module is configured to determine the formulation of a customized beverage based on at least one user choice collected at or about the time the request to produce a customized beverage is received.

9. The system of statements 7 or 8, wherein the at least one user choice includes selections made by the user in response to questions presented to the user on a user interface.

10. The system of any one of statements 7-9, wherein at least one export module is configured to export the user-specific instructions including updating the user profile with information related to the composition of the customized beverage.

11. The system of any one of statements 7-10, wherein the composition of the customized beverage is stored at a database and presented to the user as one of the at least one user choices.

12. The system of any one of statements 7-11, wherein at least one formulation module is configured to determine the formulation of a customized beverage includes using the maintained dispenser information.

13. A machine readable medium for producing a customized beverage formulation, including instructions, which when performed by a machine, causes the machine to perform the operations of: receiving and storing user information on a user profile including information relating to a user's nutritional requirements and/or exercise; receiving, from a network, a request to produce a customized beverage, the request preferably including an identifier unique to the user profile; maintaining, over a network, dispenser information including an ingredient inventory at a dispensing station; based on the user information, determining a formulation of a customized beverage including an ingredient; based on the formulation, generating user-specific beverage composition instructions for adding and mixing the ingredients; exporting the user-specific instructions to a network.

14. The method of statement 13, wherein determining the formulation of a customized beverage is further based on at least one user choice collected at or about the time the request to produce a customized beverage is received.

15. The method of statement 13 or 14, wherein the at least one user choice includes selections made by the user in response to questions presented to the user on a user interface.

16. The method of any one of statements 13-15, wherein exporting the user-specific instructions includes updating the user profile with information related to the composition of the customized beverage.

17. The method of any one of statements 13-16, wherein the composition of the customized beverage is stored at a database and presented to the user as one of the at least one user choices.

18. The method of any one of statements 13-17, wherein determining a formulation of a customized beverage including an ingredient includes using the maintained dispenser information.

The invention claimed is:

1. A method for producing a customized beverage, the comprising:
    receiving, from a network, a user profile including information relating to a user's nutritional requirements and schedule information, wherein the schedule information relates to an activity;
    storing or accessing information about the schedule information;
    receiving a request to produce a customized beverage, the request including an identifier unique to the user profile;
    based on the user profile, determining a formulation of a customized beverage that includes one or more powdered drink mixtures;
    based on an activity identified in the schedule information, including an activity related ingredient in the determined formulation of the customized beverage to create an activity related beverage composition that includes the activity related ingredient;

dispensing at least one of the one or more powdered drink mixtures to ensure a correct composition in accordance with the formulation;

producing the customized beverage by mixing the one or more powdered drink mixtures with water; and dispensing the customized beverage from a dispensing device.

2. The method of claim 1, wherein the user profile comprises one or more user preferences including a preferred beverage temperature of the customized beverage, and wherein the method further comprises:

setting the customized beverage to the preferred beverage temperature before dispensing the customized beverage from the dispensing device.

3. The method of claim 1, wherein determining the formulation of the customized beverage comprises determining an availability of the one or more powdered drink mixtures in the dispensing device for producing the customized beverage.

4. The method of claim 3, wherein the availability of the one or more powdered drink mixtures is stored at a database.

5. The method of claim 1, wherein determining the formulation of the customized beverage comprises using a human-readable beverage formulation specified in a percentage-format to generate machine-readable beverage composition instructions specifying one or more quantities of ingredients in a numeric format.

6. The method of claim 1, wherein determining a formulation of a customized beverage includes receiving, at the dispensing device, a flavor indicator providing instructions for flavoring the customized beverage.

7. The method of claim 1, further comprising:

verifying a sufficiency of the ingredient, in an inventory of the dispensing device, for the formulation of the schedule-based beverage composition.

8. The method of claim 1, further comprising determining a native language of the user and automatically presenting information at the user interface of the dispensing device in the native language.

9. A system for producing a customized beverage, the system comprising:

a machine-readable medium including instructions; and at least one processor configured by the instructions to perform operations comprising, at least:

receiving, from a network, a user profile including information relating to a user's nutritional requirements and schedule information, wherein the schedule information relates to an activity;

storing or accessing information about the schedule information;

receiving a request to produce a customized beverage, the request including an identifier unique to the user profile;

based on the user profile, determining a formulation of a customized beverage that includes one or more powdered drink mixtures;

based on an activity identified in the schedule information, including an activity related ingredient in the determined formulation of the customized beverage to create an activity related beverage composition that includes the activity related ingredient;

generate instructions for dispensing at least one of the one or more powdered drink mixtures to ensure a correct composition in accordance with the formulation;

generate instructions for producing the customized beverage by mixing the one or more powdered drink mixtures with water; and generate instructions for dispensing the customized beverage from a dispensing device.

10. The system of claim 9, wherein the user profile comprises one or more user preferences including a preferred beverage temperature of the customized beverage, and wherein the operations further comprise:

setting the customized beverage to the preferred beverage temperature before dispensing the customized beverage from the dispensing device.

11. The system of claim 9, wherein determining the formulation of the customized beverage comprises determining an availability of the one or more powdered drink mixtures in the dispensing device for producing the customized beverage.

12. The system of claim 11, wherein the availability of the one or more powdered drink mixtures is stored at a database.

13. The system of claim 9, wherein determining the formulation of the customized beverage comprises using a human-readable beverage formulation specified in a percentage-format to generate machine-readable beverage composition instructions specifying one or more quantities of ingredients in a numeric format.

14. The system of claim 9, wherein determining a formulation of a customized beverage includes receiving, at the dispensing device, a flavor indicator providing instructions for flavoring the customized beverage.

15. The system of claim 9, wherein the operations further comprise:

verifying a sufficiency of the ingredient, in an inventory of the dispensing device, for the formulation of the schedule-based beverage composition.

16. The system of claim 9, further comprising determining a native language of the user and automatically presenting information at the user interface of the dispensing device in the native language.

17. A non-transitory machine-readable medium including instructions, which when read by a machine, cause the machine to perform operations comprising, at least:

receiving, from a network, a user profile including information relating to a user's nutritional requirements and schedule information, wherein the schedule information relates to an activity;

storing or accessing information about the schedule information;

receiving a request to produce a customized beverage, the request including an identifier unique to the user profile;

based on the user profile, determining a formulation of a customized beverage that includes one or more powdered drink mixtures;

based on an activity identified in the schedule information, including an activity related ingredient in the determined formulation of the customized beverage to create an activity related beverage composition that includes the activity related ingredient;

generate instructions for dispensing at least one of the one or more powdered drink mixtures to ensure a correct composition in accordance with the formulation;

generate instructions for producing the customized beverage by mixing the one or more powdered drink mixtures with water; and generate instructions for dispensing the customized beverage from a dispensing device.

18. The medium of claim 17, wherein the user profile comprises one or more user preferences including a preferred beverage temperature of the customized beverage, and wherein the operations further comprise:
setting the customized beverage to the preferred beverage temperature before dispensing the customized beverage from the dispensing device.

19. The medium of claim 17, wherein determining the formulation of the customized beverage comprises determining an availability of the one or more powdered drink mixtures in the dispensing device for producing the customized beverage.

20. The medium of claim 19, wherein the availability of the one or more powdered drink mixtures is stored at a database.

21. The medium of claim 17, wherein determining the formulation of the customized beverage comprises using a human-readable beverage formulation specified in a percentage-format to generate machine-readable beverage composition instructions specifying one or more quantities of ingredients in a numeric format.

22. The medium of claim 17, wherein determining a formulation of a customized beverage includes receiving, at the dispensing device, a flavor indicator providing instructions for flavoring the customized beverage.

23. The medium of claim 17, wherein the operations further comprise:
verifying a sufficiency of the ingredient, in an inventory of the dispensing device, for the formulation of the schedule-based beverage composition.

24. The medium of claim 17, further comprising determining a native language of the user and automatically presenting information at the user interface of the dispensing device in the native language.

* * * * *

UNITED STATES PATENT AND TRADEMARK OFFICE
CERTIFICATE OF CORRECTION

Page 1 of 1

PATENT NO. : 10,706,388 B2
APPLICATION NO. : 16/700637
DATED : July 7, 2020
INVENTOR(S) : Dhagumudi et al.

It is certified that error appears in the above-identified patent and that said Letters Patent is hereby corrected as shown below:

On the Title Page

Item (73), in "Assignee", in Column 1, Line 1, delete "My Aveta" and insert --MyAveta-- therefor In the Drawings On sheet 6 of 9, Fig. 6, delete "CO 2" and insert --$CO_2$-- therefor On sheet 8 of 9, Fig. 8, reference numeral 88, Line 1, delete "88" and insert --820-- therefor In the Specification In Column 11, Line 10, delete "(CO 2)" and insert --($CO_2$)-- therefor In Column 14, Line 33, after "Android™", insert --,--

In the Claims

In Column 20, Line 51, in Claim 1, after "the", insert --method--

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*